United States Patent
Gebert et al.

(10) Patent No.: US 11,838,818 B2
(45) Date of Patent: Dec. 5, 2023

(54) METHOD FOR TRANSFERRING AN ACCESS NODE

(71) Applicant: NOKIA SOLUTIONS AND NETWORKS OY, Espoo (FI)

(72) Inventors: Jens Gebert, Oberstenfeld (DE); Ece Ozturk, Munich (DE); Hannu Flinck, Helsinki (FI); Ömer Bulakci, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/141,748

(22) Filed: May 1, 2023

(65) Prior Publication Data

US 2023/0354132 A1 Nov. 2, 2023

(30) Foreign Application Priority Data

Apr. 29, 2022 (FI) .................................. 20225364

(51) Int. Cl.
*H04W 36/10* (2009.01)
*H04W 36/38* (2009.01)

(52) U.S. Cl.
CPC ......... *H04W 36/10* (2013.01); *H04W 36/385* (2013.01)

(58) Field of Classification Search
CPC .......................... H04W 36/10; H04W 36/385
See application file for complete search history.

(56) References Cited

U.S. PATENT DOCUMENTS

2021/0014912 A1* 1/2021 Song ................. H04W 76/12
2022/0287038 A1* 9/2022 Singh ................. H04L 67/61

FOREIGN PATENT DOCUMENTS

| CN | 111642011 A | 9/2020 |
| WO | 2020/242987 A1 | 12/2020 |
| WO | 2021/066588 A1 | 4/2021 |
| WO | 2022/033393 A1 | 2/2022 |

OTHER PUBLICATIONS

Finnish Office Action and Search Report corresponding to FI Appln. No. 20225364, dated Sep. 28, 2022.

(Continued)

*Primary Examiner* — Hashim S Bhatti
(74) *Attorney, Agent, or Firm* — SQUIRE PATTON BOGGS (US) LLP

(57) ABSTRACT

An apparatus and method comprising implementing a near-real-time radio access network intelligent controller, and detecting an event triggering a need for transfer of control of at least one access node from said near-real-time radio access network intelligent controller to a target near-real-time radio access network intelligent controller. An address of the target near-real-time radio access network intelligent controller is determined, and an interface between the near-real-time radio access network intelligent controller and the target near-real-time radio access network intelligent controller is established. The transfer of the control of the at least one access node from said near-real-time radio access network intelligent controller to the target near-real-time radio access network intelligent controller is carried out.

13 Claims, 11 Drawing Sheets

(56) References Cited

OTHER PUBLICATIONS

Finnish Communication of Acceptance—section 29 a of Patents Decree corresponding to FI Appln. No. 20225364, dated Sep. 28, 2022.
O-RAN.WG3.RICARCH-V02.01, O-RAN Working Group 3 Near-Real-time RAN Intelligent Controller Near-RT RIC Architecture.
Kuklinski S et al On O-RAN, MEC, SON and Network Slicing integration. In: 2020 IEEE Globecom Workshops (GC Wkshps), Dec. 7-11, 2020, Taipei, Taiwan.
Extended European Search Report dated Sep. 21, 2023 corresponding to European Patent Application No. 23169969.5.
Michele Polese et al., "Understanding O-RAN: Architecture, Interfaces, Algorithms, Security, and Research Challenges," arxiv.org, Feb. 2, 2022, XP091149164.

* cited by examiner

METHOD FOR TRANSFERRING AN ACCESS NODE

CROSS REFERENCE TO RELATED APPLICATION

This application claims priority to Finnish Application No. 20225364, filed on Apr. 29, 2022. The entire contents of the above-referenced application is hereby incorporated by reference.

TECHNICAL FIELD

The present invention relates to an access node transfer procedure among network entities.

BACKGROUND 5G specifications provide an option to split the internal structure of an access node gNodeB (gNB) into entities called CU (Central Unit) and one or more DUs (Distributed Unit), which are connected by a F1 interface. There may also be a RAN (Radio Access Network) intelligent controller (RIC) connected through an E2 interface to the nodes gNB-DU and gNB-CU. RIC is a logical function that, according to O-RAN (Open Radio Access Network) architecture (as defined by the O-RAN alliance), may be further divided into functions of a non-real-time (non-RT) RIC and a near-real-time (near-RT) RIC with the non-RT RIC carrying out service management and orchestration (SMO) operations for one or more near-RT RIC over the A1 interface. The near-real-time RIC enables near-real-time control and optimization of various RAN elements (referred to as E2 Nodes) and resources via fine-grained data collection and actions over E2 interface.

An E2 Node may be connected to only one Near-RT RIC. Partly from the same reason, there is no interface specified between two Near-RT RIC's nor a procedure defined for a handover of the E2 Node from the first Near-RT RIC to the second Near-RT RIC.

However, there may arise a situation, where due to the mobility of the E2 Node, the E2 Node may enter into a region managed by another Near-RT RIC. The E2 Node cannot, nevertheless, seamlessly change its association from previous Near-RT RIC to a new Near-RT RIC.

SUMMARY

Now, an improved method and technical equipment implementing the method has been invented, by which the above problems are alleviated. Various aspects include a method, an apparatus and a non-transitory computer readable medium comprising a computer program, or a signal stored therein, which are characterized by what is stated in the independent claims. Various details of the embodiments are disclosed in the dependent claims and in the corresponding images and description.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect, there is provided an apparatus comprising means for implementing a near-real-time radio access network intelligent controller; means for detecting an event triggering a need for transfer of control of at least one access node from said near-real-time radio access network intelligent controller to a target near-real-time radio access network intelligent controller; means for determining an address of the target near-real-time radio access network intelligent controller; means for establishing an interface between said near-real-time radio access network intelligent controller and the target near-real-time radio access network intelligent controller; and means for carrying out the transfer of the control of the at least one access node from said near-real-time radio access network intelligent controller to the target near-real-time radio access network intelligent controller.

According to an embodiment, said means for carrying out the transfer of the control of the at least one access node comprises means for transferring a context of the at least one access node from said near-real-time radio access network intelligent controller to the target near-real-time radio access network intelligent controller.

According to an embodiment, the context of the at least one access node comprises one or more of the following: a list of access nodes to be transferred, a list of configurations for each access node, a list of services and their mappings to interface-specific functions in each access node, and a list of active policies applied in each access node.

According to an embodiment, said event triggering the need for the transfer of the control of the access node is one of the following: an internal event of said near-real-time radio access network intelligent controller; an external event of said near-real-time radio access network intelligent controller; a command from another logical or physical network element to said near-real-time radio access network intelligent controller to initiate the transfer of the control of the access node.

According to an embodiment, said means for determining the address of the target near-real-time radio access network intelligent controller comprises means for obtaining the address from another logical or physical network element.

According to an embodiment, said means for determining the address of the target near-real-time radio access network intelligent controller comprises means for receiving the address from operations, administration and maintenance (OAM) functionality of the network.

According to an embodiment, said means for determining the address of the target near-real-time radio access network intelligent controller comprises means for carrying out a query about the address in a database.

According to an embodiment, the control of the at least one access node is configured to be transferred via a direct interface between the source near-real-time radio access network intelligent controller and target near-real-time radio access network intelligent controller.

According to an embodiment, the control of the at least one access node is configured to be transferred between the source near-real-time radio access network intelligent controller and target near-real-time radio access network intelligent controller via one or more access nodes.

According to an embodiment, the control of the at least one access node is configured to be transferred between the source near-real-time radio access network intelligent controller and target near-real-time radio access network intelligent controller via a non-real-time radio access network intelligent controller.

According to an embodiment, the means comprises at least one processor; and at least one memory including computer program code, the at least one memory and computer program code configured to, with the at least one processor, cause the performance of the apparatus.

An apparatus according to a second aspect comprises at least one processor and at least one memory, said at least one memory stored with computer program code thereon, the at least one memory and the computer program code configured to, with the at least one processor, cause the apparatus at least to perform: implement functionalities of a near-real-time radio access network intelligent controller; detect an event triggering a need for transfer of control of at least one access node from said near-real-time radio access network intelligent controller to a target near-real-time radio access network intelligent controller; determine an address of the target near-real-time radio access network intelligent controller; establish an interface between said near-real-time radio access network intelligent controller and the target near-real-time radio access network intelligent controller; and carry out the transfer of the control of the at least one access node from said near-real-time radio access network intelligent controller to the target near-real-time radio access network intelligent controller.

A method according to a third aspect comprises detecting, by a near-real-time radio access network intelligent controller, an event triggering a need for transfer of control of at least one access node from said near-real-time radio access network intelligent controller to a target near-real-time radio access network intelligent controller; determining, by said near-real-time radio access network intelligent controller, an address of the target near-real-time radio access network intelligent controller; establishing an interface between said near-real-time radio access network intelligent controller and the target near-real-time radio access network intelligent controller; and carrying out the transfer of the control of the at least one access node from said near-real-time radio access network intelligent controller to the target near-real-time radio access network intelligent controller.

Computer readable storage media according to further aspects comprise code for use by an apparatus, which when executed by a processor, causes the apparatus to perform the above methods.

BRIEF DESCRIPTION OF THE DRAWINGS

For a more complete understanding of the example embodiments, reference is now made to the following descriptions taken in connection with the accompanying drawings in which.

DETAILED DESCRIPTION OF SOME EXAMPLE EMBODIMENTS

The following describes in further detail suitable apparatus and possible mechanisms for carrying out the interface setup procedures involving Near-RT RICs. While the following focuses on 5G networks, the embodiments as described further below are by no means limited to be implemented in said networks only, but they are applicable in any network and protocol entities supporting the interfaces of the Near-RT RICs or equivalent entities.

Figure 1:
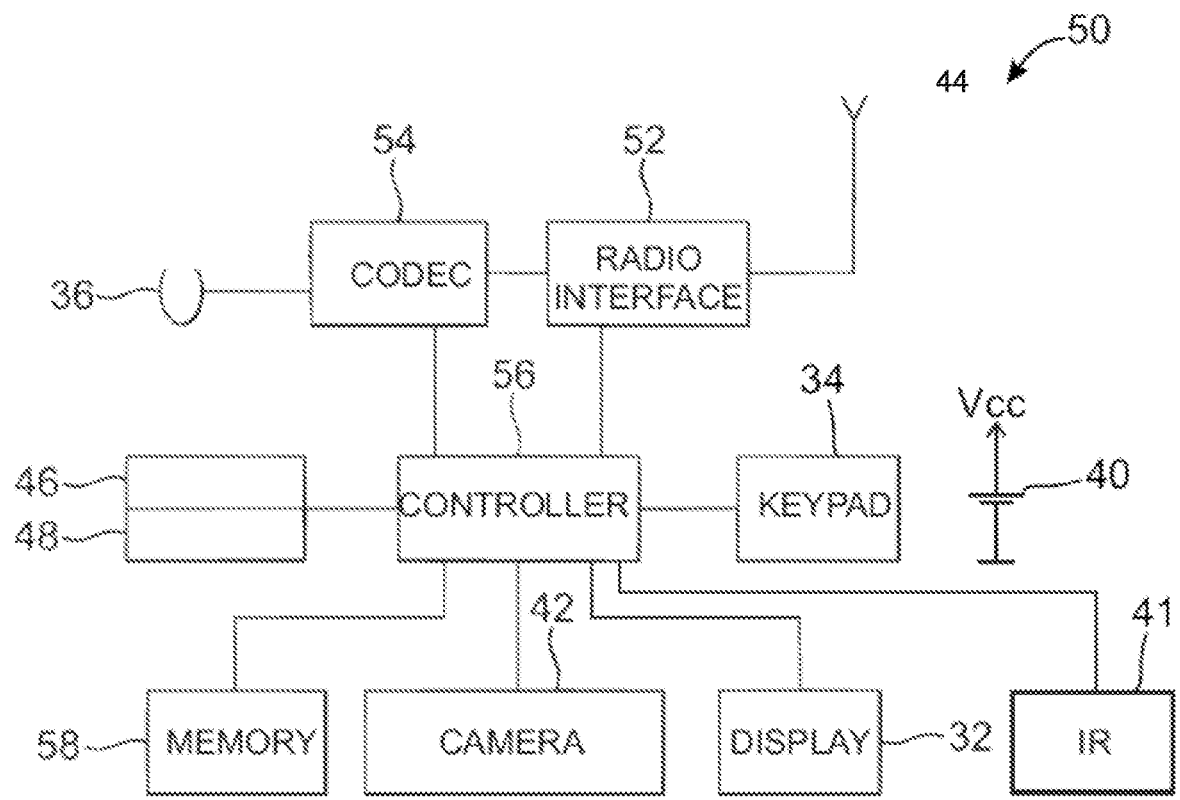
FIG. 1 shows a schematic block diagram of an apparatus for incorporating functionalities for implementing various embodiments.
Figure 2:
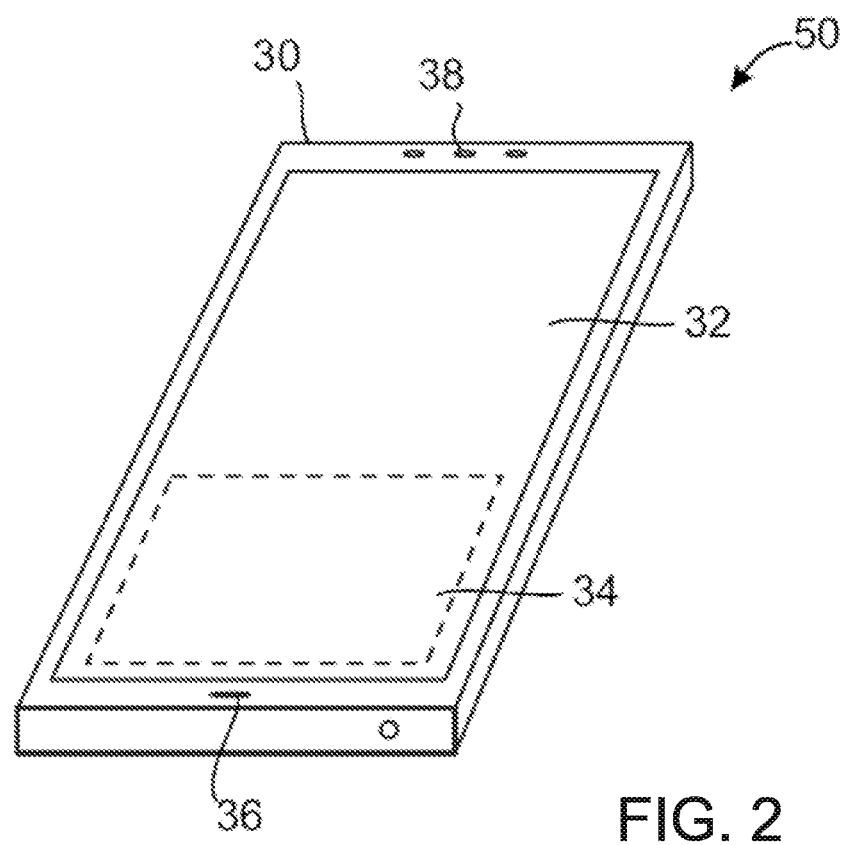
FIG. 2 shows schematically a layout of an apparatus according to an example embodiment.

In this regard, reference is first made to FIGS. 1 and 2, where FIG. 1 shows a schematic block diagram of an exemplary apparatus or electronic device 50 usable in 5G networks. FIG. 2 shows a layout of an apparatus. The elements of FIGS. 1 and 2 will be explained next.

The electronic device 50 may for example be a user device, a mobile terminal or user equipment of a wireless communication system. The apparatus 50 may comprise a housing 30 for incorporating and protecting the device. The apparatus 50 further may comprise a display 32 and a keypad 34. Instead of the keypad, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device, such as anyone of: an earpiece 38, speaker, or an analogue audio or digital audio output connection. The apparatus 50 may also comprise a battery 40 (or the device may be powered by any suitable mobile energy device such as solar cell, fuel cell or clockwork generator). The apparatus may further comprise a camera 42 capable of recording or capturing images and/or video. The apparatus 50 may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which may store both user data and instructions for implementation on the controller 56. The memory may be random access memory (RAM) and/or read only memory (ROM). The memory may store computer-readable, computer-executable software including instructions that, when executed, cause the controller/processor to perform various functions described herein. In some cases, the software may not be directly executable by the processor but may cause a computer (e.g., when compiled and executed) to perform functions described herein. The controller 56 may further be connected to codec circuitry 54 suitable for carrying out coding and decoding of audio and/or video data or assisting in coding and decoding carried out by the controller.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In the following, different exemplifying embodiments will be described using, as an example of an access architecture to which the embodiments may be applied, a radio access architecture based on Long Term Evolution Advanced (LTE Advanced, LTE-A) or new radio (NR, 5G), or beyond 5G, e.g., 6G, without restricting the embodiments to such an architecture, however. A person skilled in the art appreciates that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 3:
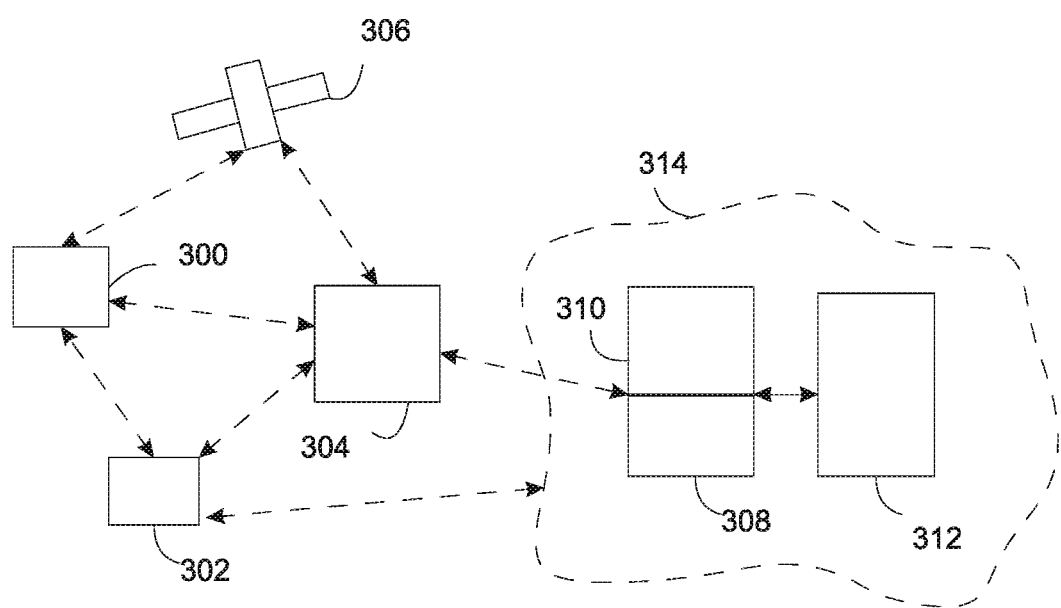
FIG. 3 shows a part of an exemplifying radio access network.

FIG. 3 depicts examples of simplified system architectures only showing some elements and functional entities, all being logical units, whose implementation may differ from what is shown. The connections shown in FIG. 3 are logical connections; the actual physical connections may be different. It is apparent to a person skilled in the art that the system typically comprises also other functions and structures than those shown in FIG. 3. The embodiments are not, however, restricted to the system given as an example but a person skilled in the art may apply the solution to other communication systems provided with necessary properties.

The example of FIG. 3 shows a part of an exemplifying radio access network.

FIG. 3 shows user devices 300 and 302 configured to be in a wireless connection on one or more communication channels in a cell with an access node (such as (e/g)NodeB or a base transceiver station (BTS)) 304 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node (such as Integrated Access and Backhaul (IAB) node), host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is or comprises a computing device configured to control the radio resources of communication system it is coupled to. The NodeB may also be referred to as a base station, an access point, an access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 310 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access and Mobility Management Function (AMF).

In 5G NR, the User Plane Function (UPF) may be used to separate the control plane and the user plane functions. Therein, the Packet Gateway (PGW) control and user plane functions may be decoupled, whereby the data forwarding component (PGW-U) may be decentralized, while the PGW-related signaling (PGW-C) may remain in the core. This allows packet processing and traffic aggregation to be performed closer to the network edge, increasing bandwidth efficiencies while reducing network.

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. Accordingly, the user device may be an IoT-device. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input — multiple output (MIMO) antennas, many more base stations or nodes than the LTE (a so-called small cell concept), including macro sites operating in co-operation with smaller stations and employing a variety of radio technologies depending on service needs, use cases and/or spectrum available. The access nodes of the radio network form transmission/reception (TX/Rx) points (TRPs), and the UEs are expected to access networks of at least partly overlapping multi-TRPs, such as macro-cells, small cells, pico-cells, femto-cells, remote radio heads, relay nodes, etc. The access nodes may be provided with Massive MIMO antennas, i.e. very large antenna array consisting of e.g. hundreds of antenna elements, implemented in a single antenna panel or in a plurality of antenna panels, capable of using a plurality of simultaneous radio beams for communication with the UE. The UEs may be provided with MIMO antennas having an antenna array consisting of e.g. dozens of antenna elements, implemented in a single antenna panel or in a plurality of antenna panels. Thus, the UE may access one TRP using one beam, one TRP using a plurality of beams, a plurality of TRPs using one (common) beam or a plurality of TRPs using a plurality of beams.

The 4G/LTE networks support some multi-TRP schemes, but in 5G NR the multi-TRP features are enhanced e.g. via transmission of multiple control signals via multi-TRPs, which enables to improve link diversity gain. Moreover, high carrier frequencies (e.g., mmWaves) together with the Massive MIMO antennas require new beam management procedures for multi-TRP technology.

5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT (Radio Access Technology) operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

Frequency bands for 5G NR are separated into two frequency ranges: Frequency Range 1 (FR1) including sub-6 GHz frequency bands, i.e. bands traditionally used by previous standards, but also new bands extended to cover potential new spectrum offerings from 410 MHz to 7125 MHz, and Frequency Range 2 (FR2) including frequency bands from 24.25 GHz to 52.6 GHz. Thus, FR2 includes the bands in the mmWave range, which due to their shorter range and higher available bandwidth require somewhat different approach in radio resource management compared to bands in the FR1.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 312, or utilize services provided by them. The communication network may also be able to support the usage of cloud services, for example at least part of core network operations may be carried out as a cloud service (this is depicted in FIG. 3 by "cloud" 314). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head, radio unit (RU) or base station comprising radio parts. It is also possible that node operations will be distributed among a plurality of servers, nodes or hosts. Application of cloudRAN architecture enables RAN real time functions being carried out at the RAN side (e.g. in a distributed unit, DU) and non-real time functions being carried out in a centralized manner (e.g. in a centralized unit, CU 308).

While Cloud RAN and Open RAN (ORAN or O-RAN) may have ties and may often be discussed together, they may also be considered as different technologies and one can be applied without the other. Open RAN defines, for example, open interfaces between network elements, while Cloud RAN may, for example, virtualize the baseband and separate baseband hardware and software. The open radio access network, O-RAN, as defined by the Open RAN Alliance, refers to a concept enabling interoperability of RAN elements between different vendors over a set of defined interfaces. Thus, O-RAN architecture for example enables baseband unit and radio unit components from different vendors to operate together.

It should also be understood that the distribution of labor between core network operations and base station operations may differ from that of the LTE or even be non- existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (e/gNB). It should be appreciated that MEC can be applied in 4G networks as well. The gNB is a next generation Node B (or, new Node B) supporting the 5G network (i.e., the NR).

5G may also utilize non-terrestrial nodes 306, e.g. access nodes, to enhance or complement the coverage of 5G service, for example by providing backhauling, wireless access to wireless devices, service continuity for machine-to-machine (M2M) communication, service continuity for Internet of Things (IoT) devices, service continuity for passengers on board of vehicles, ensuring service availability for critical communications and/or ensuring service availability for future railway/maritime/aeronautical communications. The non-terrestrial nodes may have fixed positions with respect to the Earth surface or the non-terrestrial nodes may be mobile non-terrestrial nodes that may move with respect to the Earth surface. The non-terrestrial nodes may comprise satellites and/or HAPSs (High Altitude Platform Stations). Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node 304 or by a gNB located on-ground or in a satellite.

A person skilled in the art appreciates that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The Radio Resource Control (RRC) protocol is used in various wireless communication systems for defining the air interface between the UE and a base station, such as eNB/gNB. This protocol is specified by 3GPP in in TS 36.331 for LTE and in TS 38.331 for 5G. In terms of the RRC, the UE may operate in LTE and in 5G in an idle mode or in a connected mode, wherein the radio resources available for the UE are dependent on the mode where the UE at present resides. In 5G, the UE may also operate in inactive mode. In the RRC idle mode, the UE has no connection for communication, but the UE is able to listen to page messages. In the RRC connected mode, the UE may operate in different states, such as CELL_DCH (Dedicated Channel), CELL_FACH (Forward Access Channel), CELL_PCH (Cell Paging Channel) and URA_PCH (URA Paging Channel). The UE may communicate with the eNB/gNB via various logical channels like Broadcast Control Channel (BCCH), Paging Control Channel (PCCH), Common Control Channel (CCCH), Dedicated Control Channel (DCCH), Dedicated Traffic Channel (DTCH).

The transitions between the states are controlled by a state machine of the RRC. When the UE is powered up, it is in a disconnected mode/idle mode. The UE may transit to RRC connected mode with an initial attach or with a connection establishment. If there is no activity from the UE for a short time, eNB/gNB may suspend its session by moving to RRC Inactive and can resume its session by moving to RRC connected mode. The UE can move to the RRC idle mode from the RRC connected mode or from the RRC inactive mode.

The actual user and control data from network to the UEs is transmitted via downlink physical channels, which in 5G include Physical downlink control channel (PDCCH) which carries the necessary downlink control information (DCI), Physical Downlink Shared Channel (PDSCH), which carries the user data and system information for user, and Physical broadcast channel (PBCH), which carries the necessary system information to enable a UE to access the 5G network.

The user and control data from UE to the network is transmitted via uplink physical channels, which in 5G include Physical Uplink Control Channel (PUCCH), which is used for uplink control information including HARQ (Hybrid Automatic Repeat reQuest) feedback acknowledgments, scheduling request, and downlink channel-state information for link adaptation, Physical Uplink Shared Channel (PUSCH), which is used for uplink data transmission, and Physical Random Access Channel (PRACH), which is used by the UE to request connection setup referred to as random access.

5G specifications provide an option to split the internal structure of a gNB into entities called CU (Central Unit) and one or more DUs (Distributed Unit), which are connected by a F1 interface, as specified in 3GPP 38.473. The split may provide traffic aggregation in terms of one gNB CU serving a plurality of gNB DUs operating as the actual node points for the air interface. The gNB-CU may be further split to CU-CP (Control Plane) and CU-UP (User Plane) and E1 interface has been introduced between them. Information of available resources and load must be shared across these network entities to implement various RRM (Radio Resource Management) functionalities.

Figure 4:
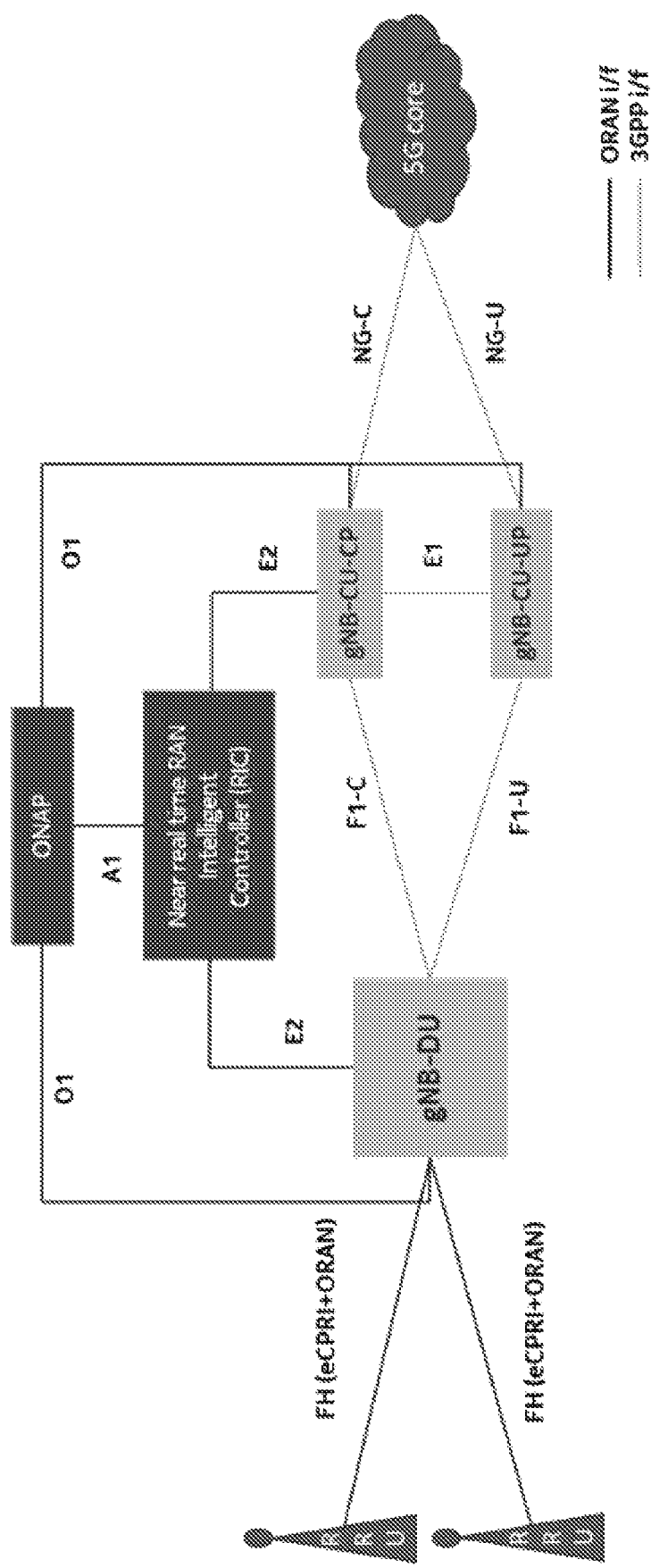
FIG. 4 illustrates overview on the 5G deployment model for the split gNB.

FIG. 4 provides a basic overview on the 5G deployment model for the split gNB. The gNB comprises a Centralized Unit (gNB-CU) and one or more Distributed Units (gNB- DUs) connected to the gNB-CU. gNB-CU is a logical node that includes the gNB functions like user data transfer, Mobility management, Radio access network sharing, Positioning, Session Management etc., except such functions, which are allocated exclusively to the gNB-DU. gNB-CU controls the operation of gNB-DUs over F1 interface.

As discussed above, O-RAN (Open Radio Access Network) provides open standards to complement what 3GPP has already defined in terms of functionalities, with a special focus on Radio Access Network (RAN) programmability and the application of ML/AI techniques. A RAN intelligent controller (RIC) is specified in ORAN WG3 (Working Group 3). The RIC may be divided into functions of a non-real-time (Non-RT) RIC and a near-real-time (Near-RT) RIC.

Figure 5:
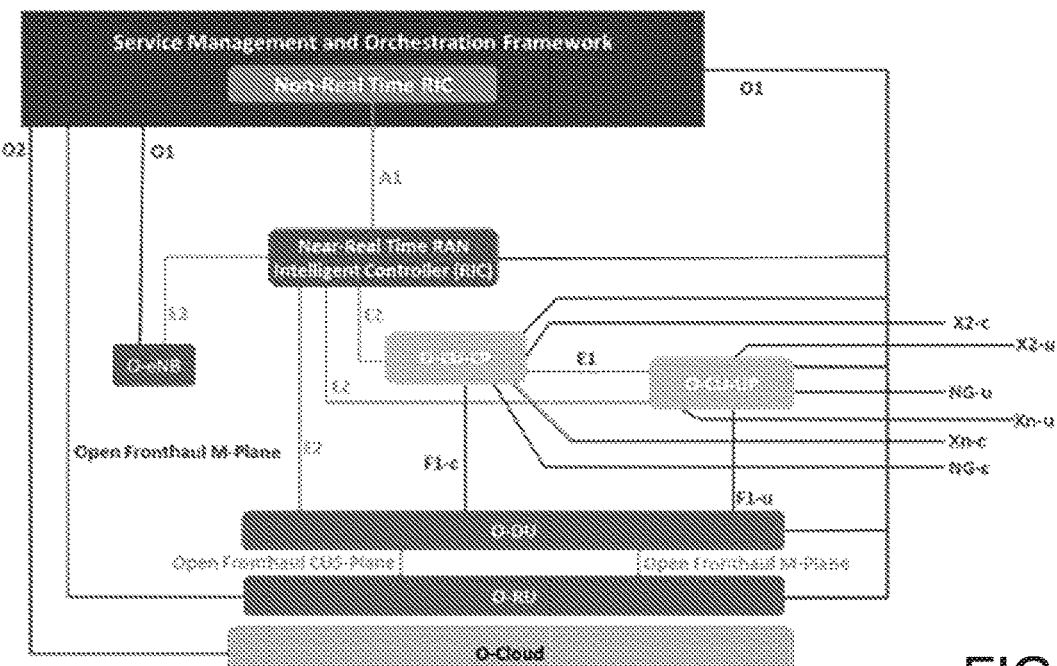
FIG. 5 shows an example of various interfaces among a variety of network elements in the O-RAN architecture provided with eNB and the split parts of gNB.

FIG. 5 shows various interfaces to a variety of network elements. It is noted that in this context of describing the O-RAN architecture the above nodes eNB and the split parts of gNB, i.e. CU-CP, CU-UP and DU are referred to as O-eNB, O-CU-CP, O-CU-UP and O-DU. The Non-RT RIC operates in the Service Management and Orchestration (SMO) domain and uses A1 interface to support intelligent RAN optimization by providing policy-based guidance, i.e., Declarative Policies, ML model management and Enrichment Information to guide the Near-RT RIC. A1 is defined in the document ORAN-WG2.A1.AP: A1 Application Protocol. It connects the Non-RT RIC to Near-RT RIC using a RESTful interface to send Declarative policies to Near-RT RIC.

The Near-RT RIC is a logical function that enables near-real-time control and optimization of RAN elements and resources via fine-grained (e.g. UE basis, network slice basis, Cell basis) data collection with measurements often provided at a faster rate than normally supported over network management interfaces and actions over E2 interface.

Figure 6:
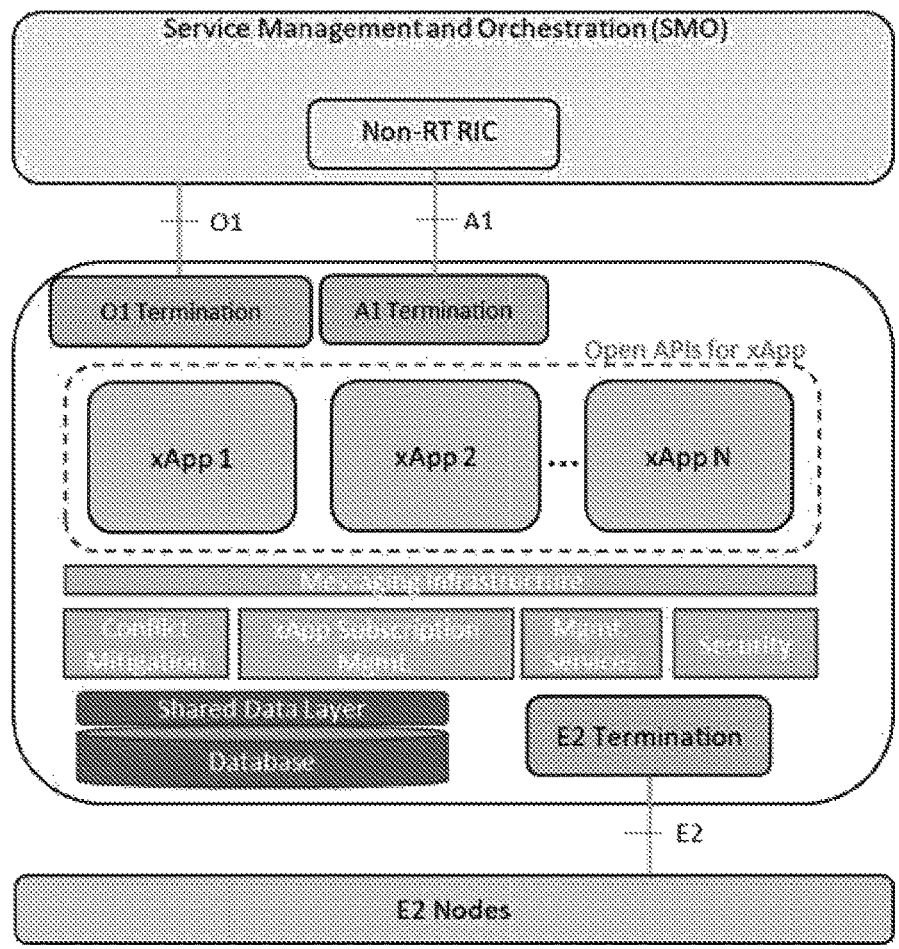
FIG. 6 shows an example of ORAN Near-RT RIC architecture.

FIG. 6 shows an example of ORAN Near-RT RIC architecture. The Near-RT RIC comprises a database, which allows reading and writing of RAN and UE information, such as the configurations relating to E2 nodes, cells, bearers, flows, UEs and the mappings between them. The Near-RT RIC hosts one or more xApps that use E2 interface to collect near real-time information (e.g. UE basis, Cell basis) and provide value-added services. An xApp consists of a descriptor and a software package. The descriptor provides metadata on the xApp related to its version, provider, software package location, management information regarding fault, configuration, accounting, performance and security (FCAPS), and the data types that it takes as input as well as that it produces as output. The software package implements the logic that collects RAN-related information coming from E2 Nodes and provides optimized and intelligent RAN control decisions.

The Near-RT RIC further comprises xApp subscription management, which merges subscriptions from different xApps and provides unified data distribution to xApps. The conflict mitigation function resolves potentially overlapping or conflicting requests from multiple xApps. Moreover, the messaging infrastructure enables message interaction amongst Near-RT RIC internal functions.

The database may be used for storing and fetching the cell/UE/bearer-related data. Security function provides the security schemes of xApps. Management services provide FCAPS management by tracing the transactions, logging information, and collecting metrics to capture, analyze and report the Near-RT RIC status. Interface termination terminates the connections, allows message exchange with the related O-RAN component and additional functions depending on the needs of the specific interface termination. API management service supports the API registry, discovery, authentication, and event subscriptions.

E2 interface is provided between the Near-RT RIC and E2 nodes (e.g. O-eNB, O-CU-CP, O-CU-UP and O-DU or any of their combinations). The E2 interface is defined in ORAN-WG3.E2GAP. E2 is a Control Plane interface and Imperative Policies can as well be sent over this interface to an "E2 Node", i.e. any RAN node (gNB, gNB-CU, gNB-CU-CP, gNB-DU, eNB, etc.) that exposes an E2 interface. Through the E2 interface, an E2 Node exposes the Near-RT RIC services, as mapped to E2 Functions and described according to E2 Service Models, through which the xApps are allowed to monitor and control. In return, xApps provide value-added services to E2 Node for the associated services.

E2 interface functions are divided into two categories: 1) Near-RT RIC services consisting of REPORT, CONTROL, INSERT, and POLICY, and 2) Near-RT RIC support functions which include interface management and service update procedures. E2 interface functions are realized through E2 Application Protocol (E2AP) procedures. The functions and related procedures are shown in Tables 1 and 2 below.

TABLE 1

| Initiated by | Elementary Procedure | Initiating Message | Successful Outcome Response message | Unsuccessful Outcome Response message |
|---|---|---|---|---|
| Near-RT RIC | RIC Subscription | RIC SUBSCRIPTION REQUEST | RIC SUBSCRIPTION RESPONSE | RIC SUBSCRIPTION FAILURE |
| Near-RT RIC | RIC Subscription Delete | RIC SUBSCRIPTION DELETE REQUEST | RIC SUBSCRIPTION DELETE RESPONSE | RIC SUBSCRIPTION DELETE FAILURE |
| E2 Node | RIC Service Update | RIC SERVICE UPDATE | RIC SERVICE UPDATE ACKNOWLEDGE | RIC SERVICE UPDATE FAILURE |
| Near-RT RIC | RIC Control | RIC CONTROL REQUEST | RIC CONTROL ACKNOWLEDGE | RIC CONTROL FAILURE |
| E2 Node | E2 Setup | E2 SETUP REQUEST | E2 SETUP RESPONSE | E2 SETUP FAILURE |
| E2 Node | E2 Node Configuration Update | E2 NODE CONFIGURATION UPDATE | E2 NODE CONFIGURATION UPDATE ACKNOWLEDGE | E2 NODE CONFIGURATION UPDATE FAILURE |
| Near-RT RIC | E2 Connection Update | E2 CONNECTION UPDATE | E2 CONNECTION UPDATE ACKNOWLEDGE | E2 CONNECTION UPDATE FAILURE |
| Near-RT | Reset | RESET REQUEST | RESET RESPONSE | |

TABLE 1-continued

| Initiated by | Elementary Procedure | Initiating Message | Successful Outcome Response message | Unsuccessful Outcome Response message |
| --- | --- | --- | --- | --- |
| RIC or E2 Node | | | | |

TABLE 2

| Initiated by | Elementary Procedure | Initiating Message |
| --- | --- | --- |
| E2 Node | RIC Indication | RIC INDICATION |
| Near-RT RIC | RIC Service Query | RIC SERVICE QUERY |
| E2 Node or Near-RT RIC | Error Indication | ERROR INDICATION |

RIC services are carried by using subscription, indication and control E2AP procedures. REPORT is used by Near-RT RIC to subscribe to receiving a REPORT indication message from E2 Node upon trigger of the event specified in Near-RT RIC's subscription procedure. INSERT is used by Near-RT RIC to subscribe to receiving an INSERT indication message from E2 Node upon the specified event trigger. After the event occurrence, E2 Node sends the related INSERT indication message and suspends the associated procedures until CONTROL message from Near-RT RIC is received or until the waiting timer for CONTROL message arrival expires. CONTROL is used by Near-RT RIC via control procedure to initiate a new associated procedure or resume/cancel the suspended associated procedures in E2 Node. POLICY is used by Near-RT RIC to request the E2 Node to apply the POLICY after the occurrence of specific event trigger. Unlike INSERT, POLICY is not dependent on the CONTROL message and does not suspend associated procedures.

Near-RT RIC support functions provide functionalities and procedures regarding interface management and service update. Interface management functions facilitate E2 Setup, E2 Reset, E2 Node Configuration Update, Near-RT RIC Service Update E2AP procedures as follows:

E2 Setup: This procedure is used by E2 Node to establish E2 interface to a Near-RT RIC. During the procedure, E2 Node sends an E2 Setup Request to the Near-RT RIC and provides therein a list of services and their mappings to E2 Functions within E2 Node to which E2 Node wishes to receive value-added services from Near-RT RIC. E2 Node also provides a list of E2 Node configuration information which is dependent on the E2 Node type. The Near-RT RIC extracts the lists and sends an E2 Setup Response as an acknowledgement for the successful E2 setup.

E2 Reset: This procedure can be initiated by either E2 Node or Near-RT RIC to reset the existing E2 interface in case of failure detection. Information that is already exchanged during procedures related to the service update, configuration update and interface setup are maintained; however, the subscriptions and ongoing processes are canceled.

E2 Connection Update procedure: This procedure can be initiated by either E2 Node or Near-RT RIC to update the existing E2 connection between Near-RT RIC and E2 Node. The update can be addition of a new SCTP connection or modification or removal of an existing SCTP connection, provided that there shall be at least one established SCTP connection.

E2 Node Configuration Update: It is used by E2 Node to inform the Near-RT RIC of the changes to the E2 Node configuration information that was previously exchanged during interface setup.

Near-RT RIC Service Update: This is used by E2 Node to inform the Near-RT RIC of the changes to the list of services that was previously exposed to Near-RT RIC during interface setup. This can also be triggered within E2 Node by Near-RT RIC through the use of RIC SERVICE QUERY message.

According to the current O-RAN specifications, an E2 Node may be connected to only one Near-RT RIC. Partly from the same reason, there is no interface specified between two Near-RT RIC's nor a procedure defined for providing an E2 Node connected to a first Near-RT RIC with an added connection to a second Near RT RIC or a handover of the E2 Node from the first Near-RT RIC to the second Near-RT RIC.

However, Near-RT RIC can have the ability to discover/contact other Near-RT RICs for various reasons. For example, a E2 Node transfer process may involve information exchange between two or more Near-RT RICs. E2 Node transfer may be needed due to a) limited available resources where Near-RT RIC may decide offload the E2 Node to another Near-RT RIC, b) planned maintenance where the connected Near-RT RIC will be out of service and may decide to offer an alternative Near-RT RIC to accommodate the affected E2 Node, or c) E2 Node mobility in which the E2 Node may enter into a region managed by another Near-RT RIC but might not have been configured to find/discover this Near-RT RIC.

For example, the mobility of the E2 Node may become relevant upon application of Mobile Integrated access and Backhaul (Mobile IAB). IAB is a L2 relaying technology defined in 3GPP supporting multi-hop in the backhaul. Mobile IAB may be considered an E2 Node providing a moving cell, where the Mobile IAB serves UEs e.g. in a bus or a train.

Figure 7:
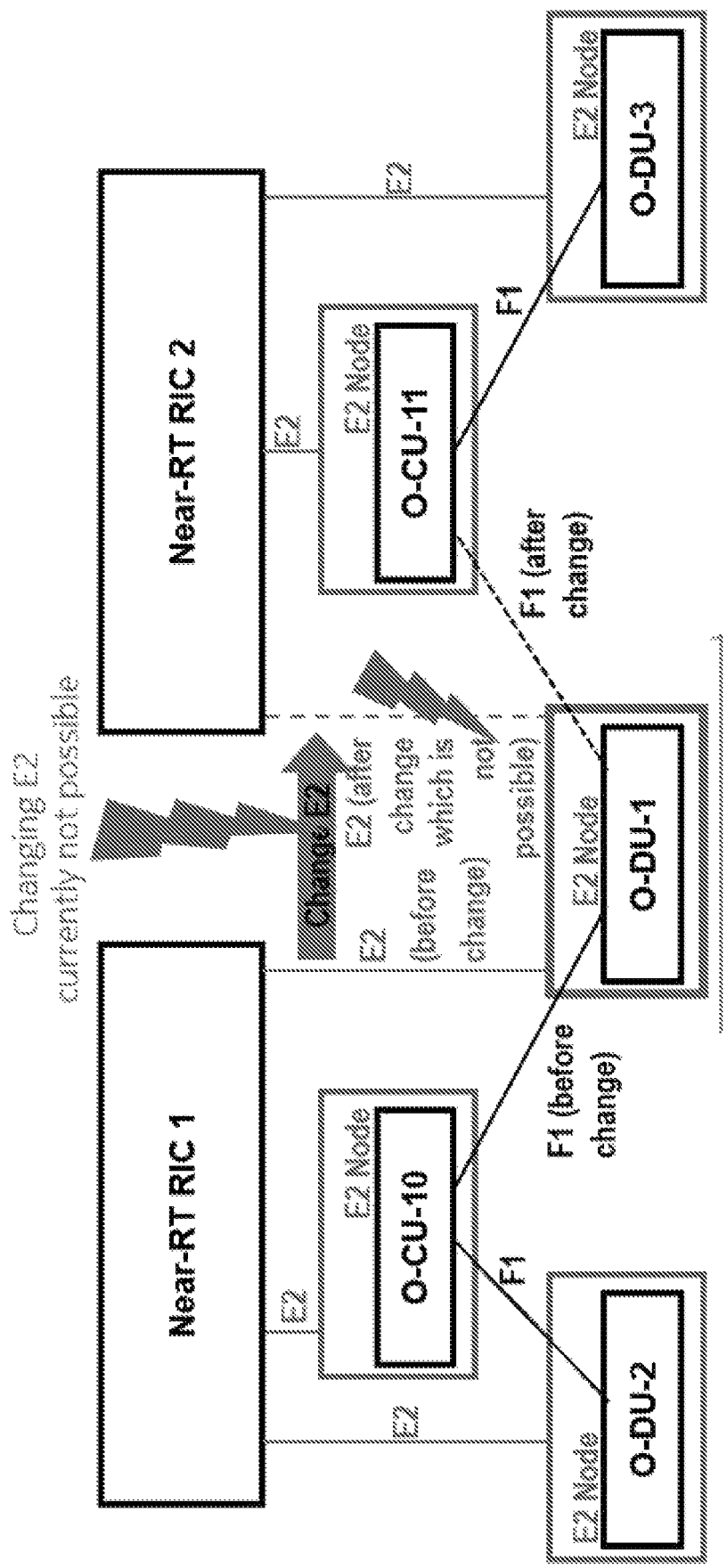
FIG. 7 illustrates a problem caused by the lack of a seamless handover between Near-RT RICs.

The problem caused by the lack of a seamless handover between Near-RT RICs is illustrated in FIG. 7. An E2 Node hosting a DU (O-DU-), which may be e.g. a Mobile IAB Node, is moving from the area managed by O-CU-10 and Near-RT RIC 1 to the area managed by O-CU-11 and Near-RT RIC 2. As specified in 3GPP TS 38.300, each DU has an F1-interface to a CU. Thus, the O-DU-1 is initially connected via the F1-interface to the O-CU-10 and both O-DU-1 and O-CU-10 have an E2-interface towards the Near-RT RIC1.

Due to the mobility, O-DU-1 is moving to the area of O-CU-11. The O-DU-1 can change its F1-association from the O-CU-10 to O-CU-11 with procedures like IAB inter-donor topology adaptation.

However, the O-DU-1 cannot change its association from Near-RT RIC1 to Near-RT RIC2. This is especially problematic, because the O-DU and the O-CU should be associated with the same Near-RT RIC in the current specifications.

It could be possible to use the E2 Reset procedure to seize the connection to Near-RT RIC1, thereby causing a failure, and then carrying out the E2 Reset procedure to Near-RT RIC2. However, such procedure does not provide a seamless transfer from Near-RT RIC1 to Near-RT RIC2.

In the following, an enhanced method for carrying out an E2 Node transfer between Near-RT RICs will be described in more detail, in accordance with various embodiments.

Figure 8:
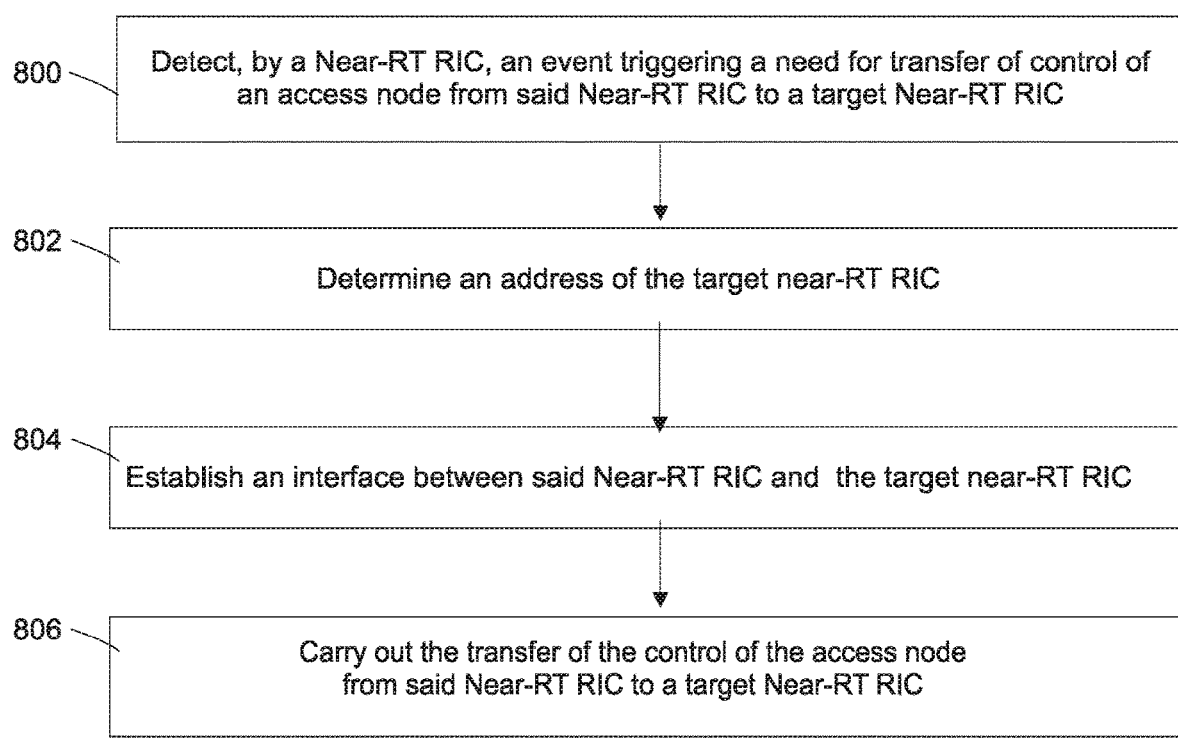
FIG. 8 shows a flow chart for carrying out an E2 Node transfer between Near-RT RICs according to an embodiment.

The method is disclosed in flow chart of FIG. 8 as reflecting the operation of an apparatus, such as a near-real-time radio access network intelligent controller (near-RT RIC), wherein the method comprises detecting (800), by a near-real-time radio access network intelligent controller, an event triggering a need for transfer of control of at least one access node from said near-real-time radio access network intelligent controller to a target near-real-time radio access network intelligent controller; determining (802), by said near-real-time radio access network intelligent controller, an address of the target near-real-time radio access network intelligent controller; establishing (804) an interface between said near-real-time radio access network intelligent controller and the target near-real-time radio access network intelligent controller; and carrying out (806) the transfer of the control of the at least one access node from said near-real-time radio access network intelligent controller to the target near-real-time radio access network intelligent controller.

Thus, an E2 Node transfer procedure between Near-RT RICs is introduced to address the shortcomings of the current E2 Reset procedure, for example, in the O-RAN specifications. By enabling the Near-RT RIC to initiate the E2 Node transfer procedure directly towards the target Near-RT RIC, the E2 Node transfer procedure may be carried out seamlessly. Thus, the Near-RT RIC may detect an event triggering a need for the transfer of the control of one or more access nodes, such as the E2 Node(s), from said Near-RT RIC, hence being the source Near-RT RIC, to a target Near-RT RIC. The source Near-RT RIC determines the address of a prominent target Near-RT RIC, which can be referred to as Near-RT RIC discovery process. The source Near-RT RIC establishes an interface to the target Near-RT RIC and then carries out the transfer of the control of the E2 Node(s) to the target Near-RT RIC seamlessly, i.e. such that the E2 Node remains connected to at least either of the source Near-RT RIC or the target Near-RT RIC all the time.

According to an embodiment, said transfer of the control of the access node comprises a transfer of a context of the at least one access node from said near-real-time radio access network intelligent controller to the target near-real-time radio access network intelligent controller.

Accordingly, information on the existing context information of the E2 Nodes at the source Near-RT RIC is transferred to target Near-RT RIC, thus including information that is exchanged in current E2 procedures between the E2 Nodes and the source Near-RT RIC. This may facilitate and speed up taking the control of the E2 Node(s) at the source Near-RT RIC.

It is, nevertheless, noted that carrying the transfer of the control of the access node (E2 Node) does not necessitate the transfer of the context of the E2 Node(s), but the source Near-RT RIC may obtain the information on the existing contexts of the E2 Nodes by itself.

According to an embodiment, the context of the access node comprises one or more of the following: a list of access nodes to be transferred, a list of configurations for each access node, a list of services and their mappings to interface-specific functions in each access node, and a list of active policies applied in each access node.

Hence, the information about the context between an E2 Node and a RIC, which is to be transferred to the target Near-RT RIC may contain a list of E2 Nodes to be transferred, a list of E2 Node configuration for each E2 Node, a list of services and their mappings to E2 Functions in each E2 Node, a list of active policies applied in each E2 Node, and/or any other information that may be crucial/beneficial for the new E2 interface between each E2 Node and the target Near-RT RIC.

According to an embodiment, said event triggering the need for the transfer of the control of the access node is one of the following: an internal event of said near-real-time radio access network intelligent controller; an external event of said near-real-time radio access network intelligent controller; a command from another logical or physical network element to said near-real-time radio access network intelligent controller to initiate the transfer of the control of the access node.

Thus, an internal event of Near-RT RIC, such as an overload situation, may trigger the transfer of the control of the access node to the target Near-RT RIC. Alternatively, the underlying reason may relate an external event, such as detecting an E2 Node mobility, where the DU of the E2 Node connects to other CU, which is served by a different Near-RT RIC. In other words, said event is an expected switching to another near-real-time radio access network intelligent controller due to mobility of the access node. Moreover, another logical or physical network element, such as Non-RT RIC, SMO or OAM, may command the (source) Near-RT RIC initiate the transfer of the control of the access node to the target Near-RT RIC.

It is noted that any other scenario in the above use cases or any other use case that requires or potentially benefits from the transfer of the control of the access node initiated by Near-RT RIC can be identified as event trigger for initiating the transfer of the control of the access node.

According to an embodiment, said determining the address of the target near-real-time radio access network intelligent controller comprises obtaining the address from another logical or physical network element.

According to an embodiment, said determining the address of the target near-real-time radio access network intelligent controller comprises receiving the address from operations, administration and maintenance (OAM) functionality of the network.

According to an embodiment, said determining the address of the target near-real-time radio access network intelligent controller comprises carrying out, by said near-real-time radio access network intelligent controller, a query about the address in a database.

Thus, the source Near-RT RIC may know the address of the target Near-RT RIC in forehand, e.g. due to knowledge provided via OAM. Alternatively, the address of the target Near-RT RIC may be provided by E2 Node, e.g. via E2 Signalling. Herein, a DU may reports its CU and the corresponding Near-RT RIC address, or the RIC, after obtaining knowledge about the target CU, asks said target CU for its RIC Address. The source Near-RT RIC may also actively ask an external database, e.g. function like O-NRF (ORAN-Network Repository Function) to provide a Near-RT RIC address, which provides the requested capabilities (e.g. serving area X, load below given threshold).

According to an embodiment, said interface is a direct interface between the source near-real-time radio access network intelligent controller and target near-real-time radio access network intelligent controller.

Figure 9:
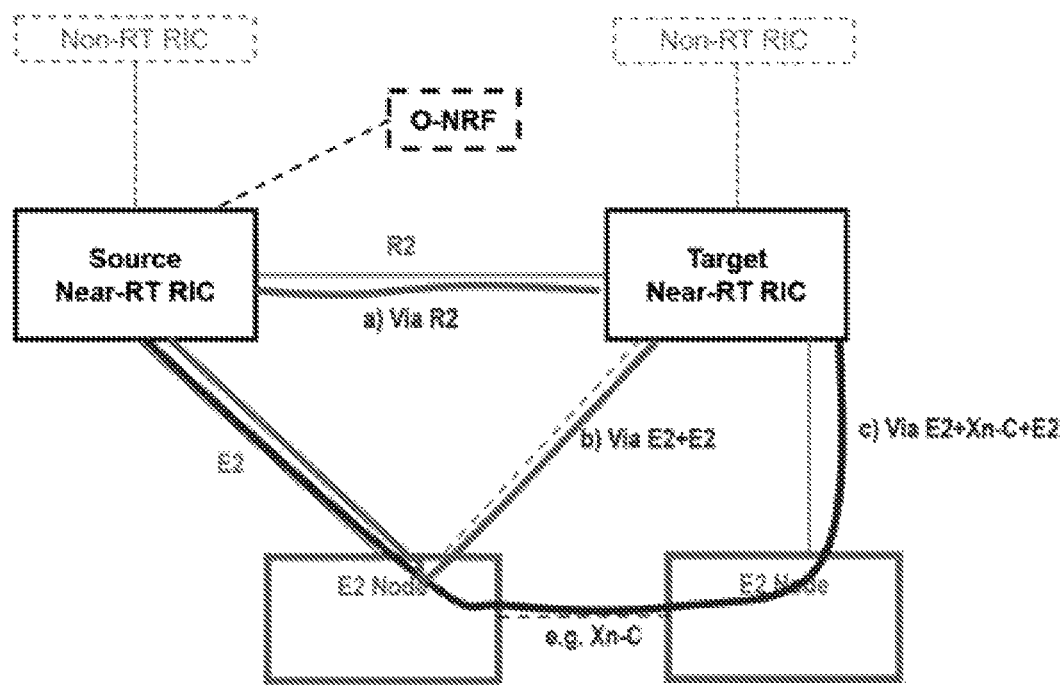
FIG. 9 shows different options for interfaces to be used in the E2 Node/Context transfer between Near-RT RICs according to some embodiments.

Hence, a new interface type, herein referred to as R2 interface, may be established between the first (source) Near-RT RIC and the second (target) Near-RT RIC for E2 Node Transfer, possibly supplemented with a RIC Context transfer. Accordingly, only one step of interface establishing is needed, as depicted in FIG. 9.

According to an embodiment, said interface is established via one or more access nodes.

Thus, an interface between the first (source) Near-RT RIC and the second (target) Near-RT RIC may be established via one E2 Node. Accordingly, two steps of interface establishing are needed, i.e. a first E2 interface from the source Near-RT RIC to the E2 Node and further a second E2 interface to the target Near-RT RIC, as shown in FIG. 9. The interface establishing may also involve two or more E2 Nodes, wherein in a case of two E2 Nodes, at least three steps of interface establishing are needed, i.e. a first E2 interface from the source Near-RT RIC to the first E2 Node, then Xn-C interface (or NG/N2 interface) between the first and a second E2 Nodes and further a second E2 interface from the second E2 Node to the target Near-RT RIC, as shown in FIG. 9.

According to an embodiment, said interface is established via a non-real-time radio access network intelligent controller.

Hence, the interface between the first (source) Near-RT RIC and the second (target) Near-RT RIC may also be established via their corresponding Non-RT RICs/SMOs. While being applicable as such, the interface via the Non-RT RIC may introduce some delay.

The method and at least some of the embodiments are illustrated in the following signalling charts. It is noted that the numerals of the signalling charts do not necessary reflect the actual order of events, but the events may take place in different order or in parallel.

Figure 10:
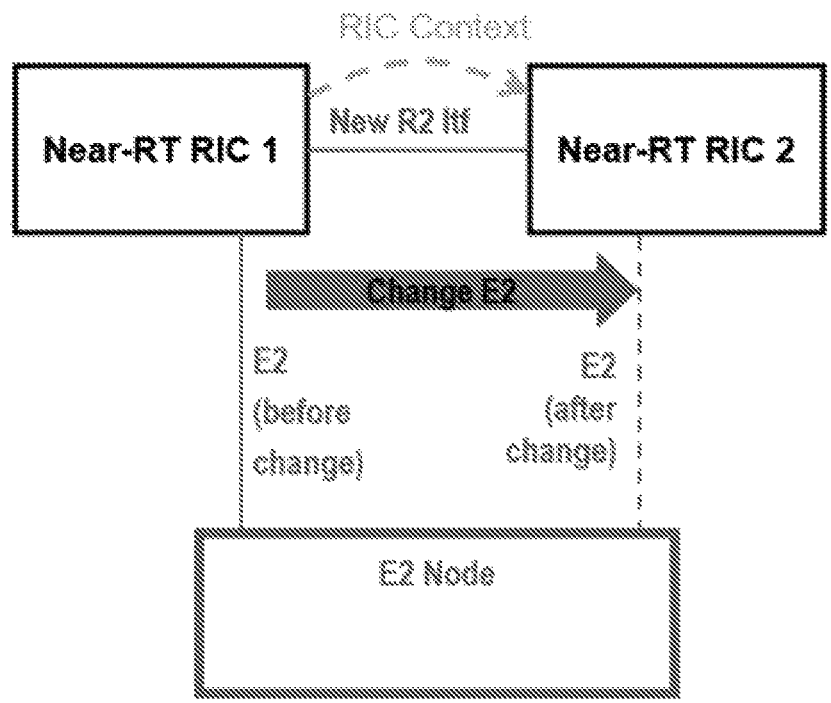
FIG. 10 shows the general idea of the E2 Node Transfer between the source Near-RT RIC1 and the target Near-RT RIC2 according to an embodiment.

FIG. 10 illustrates the general idea underlying the embodiments, wherein an E2 Node Transfer between the source Near-RT RIC1 and the target Near-RT RIC2 is carried out, possibly with a RIC Context transfer, via the new R2 interface.

Figure 11:
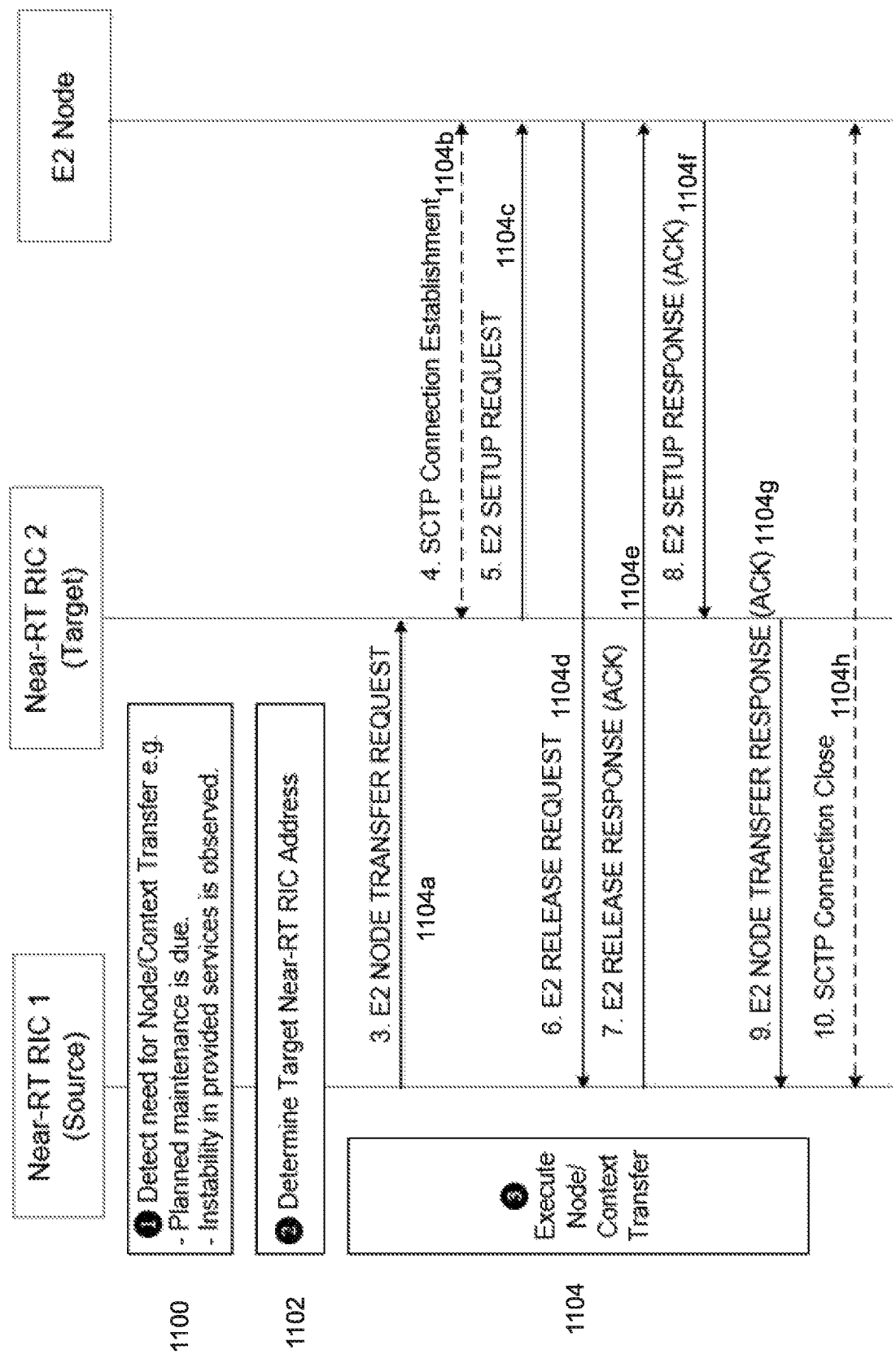
FIG. 11 shows an exemplified signalling chart for E2 Node transfer including a context transfer using a direct interface between Near-RT RICs according to an embodiment.

The signalling chart of FIG. 11 illustrates an example of E2 Node transfer including a context transfer between Near-RT RICs. The source Near-RT RIC1 detects (1100) the need of the E2 Node Transfer, including a Context Transfer based on a predetermined event, e.g. a planned maintenance, overload, instability or a mobility event. The source Near-RT RIC1 determines (1102) the address of the target Near-RT RIC2, e.g. as described above. Then the E2 Node/Context transfer between the source Near-RT RIC1 and the target Near-RT RIC2 is carried out (1104), which in this example is presumed to take place via the new R2 interface.

The actual E2 Node/Context transfer (1104) comprises a plurality of steps. The source Near-RT RIC1 (i.e. to which the relevant E2 Node is currently interfacing) sends a message (1104*a*) to the target Near-RT RIC2 (i.e. to which the E2 Node shall interface at the end of the procedure), wherein the message may be referred to as E2 NODE TRANSFER REQUEST. The message E2 NODE TRANSFER REQUEST may contain E2 Node/RIC context information, the content of which is defined above.

The target Near-RT RIC2 decides to setup an E2 connection with each of the E2 nodes to be transferred. For simplicity, only one E2 node is transferred in the example of FIG. 11. The setup is initiated in the example with an optional SCTP connection establishment (1104*b*). It is noted that in case E2 runs on different stack than SCTP/IP, the SCTP Connection Establishment would be replaced by an appropriate function.

The target Near-RT RIC2 sends an E2 Setup Request (1104*c*) to the E2 Node, and the E2 Node sends an E2 RELEASE REQUEST (1104*d*) to the source Near-RT RIC1. The Near-RT RIC1 acknowledges the release with a E2 RELEASE RESPONSE (1104*e*)).

The E2 Node acknowledges the E2 setup with a E2 SETUP RESPONSE (1104*f*) to the target Near-RT RIC2. It is noted that the E2 node is temporarily connected with two Near-RT RICs in order to ensure a seamless transition of the connection. The target Near-RT RIC2 acknowledges the E2 Node transfer to the source Near-RT RIC1 with a E2 NODE TRANSFER RESPONSE (1104*g*).

The connection between the E2 Node and the source Near-RT RIC1 can then be closed, i.e. with an SCTP Connection Close (1104*h*). As mentioned above, the order of at least some of the steps may vary without affecting to the achieved technical effect. For example, the SCTP Connection Close (1104*h*) may be performed directly after the E2 RELEASE RESPONSE (1104*f*).

Figure 12:
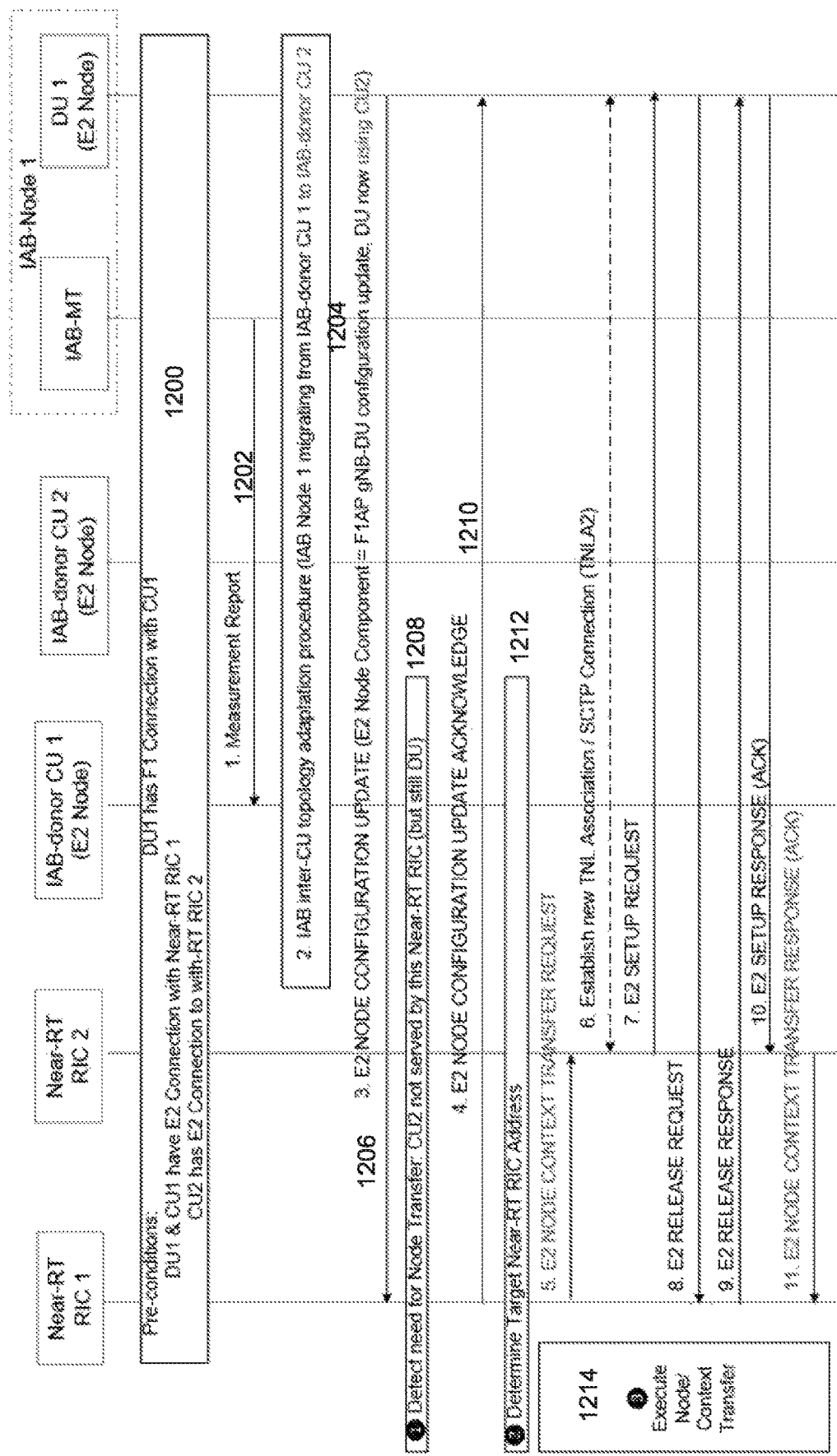
FIG. 12 shows an exemplified signalling chart for E2 Node transfer including a context transfer without a direct interface between Near-RT RICs according to an embodiment.

The signalling chart of FIG. 12 illustrates an example of otherwise similar messaging sequence as in FIG. 11, but with additional details for E2 Node Mobility implemented in a form of Mobile IAB. The example of FIG. 12 assumes a few pre-conditions (1200) such that initially DU1 has an F1 connection with CU1 and an E2 connection to the Near-RT RIC1, CU1 has an E2 connection to the Near-RT RIC1 and CU2 has an E2 connection to the Near-RT RIC2.

In the example of FIG. 12, the need for E2 Node transfer is detected based on a triggering event, which is E2 Node Mobility. Due to the mobility, the DU1 changes its CU from CU1 to CU2 by applying an inter-donor IAB-node migration as a Mobile IAB.

The signaling may include a Measurement report, wherein due to the mobility, the moving and migrating IAB-MT sends a MeasurementReport message (1202) to the source parent node IAB-DU. This report may be based on a Measurement Configuration the migrating IAB-MT received from the IAB-donor-CU earlier.

The inter-donor IAB-node migration, also referred to as IAB inter-CU topology adaptation procedure, is performed (1204). When the DU1 has now changed its CU, the DU1 sends E2 NODE CONFIGURATION UPDATE (1206) to its Near-RT RIC1. This message may include information that the DU is now using a different CU, including the identity of the new CU2. The information may be referred to, for example, as "E2 Node Component Configuration Update Item".

The Near-RT RIC1 evaluates the information from the E2 Node DU1 that DU1 is now using CU2. The Near-RT RIC1 also detects that it is not connected to the E2 Node CU2. Based on the principle that in O-RAN the O-CU and the O-DU should always be connected to the same Near-RT RIC, the Near-RT RIC1 detects (1208) the need for an E2 Node Transfer of DU1 to the Near-RT RIC2 which is serving CU2. As a result, the Near-RT RIC1 sends an E2 NODE CONFIGURATION UPDATE ACKNOWLEDGE (1210) to the E2 Node DU1.

The Near-RT RIC1 then determines (1212) the target RIC Address, i.e. the address of that Near-RT RIC which is serving CU2.

Herein, various options may be used for determining the target RIC Address:
  a) Extending the 3GPP F1 interface so that a CU can inform the DU about the Near-RT RIC Address it is using. Then, the above message "E2 NODE CONFIGURATION UPDATE" shall contain, besides the CU2 address, but also the address of the Near-RT RIC the CU2 is using. Thereby, the Near-RT RIC1 obtains the address of the Near-RT RIC the E2 Node shall be transferred to.

b) The message "E2 NODE CONFIGURATION UPDATE" may only contain CU2 address, but not the Near-RT RIC address the CU2 is using. The Near-RT MC1 may then send a new message request to the CU2 requesting information about which Near-RT RIC it is using. The CU2 sends a response including the address of the Near-RT RIC it is using. Thereby, the Near-RT RIC1 obtains the address of the Near-RT RIC the E2 Node shall be transferred to.

c) The Near-RT RIC1 requests the information from a database may be referred to, for example, as an O-NRF (ORAN-Network Repository Function), which may operate in a similar manner to a 3GPP NRF, for example. Thereby, the Near-RT RIC1 obtains the address of the Near-RT RIC the E2 Node shall be transferred to.

The rest of the signalling relating to the actual E2 Node/Context transfer (1214) may be carried out in a similar way as described in FIG. 11, i.e. the E2 Node/Context transfer (1104) and its sub-steps (1104a-1104h).

Figure 13:
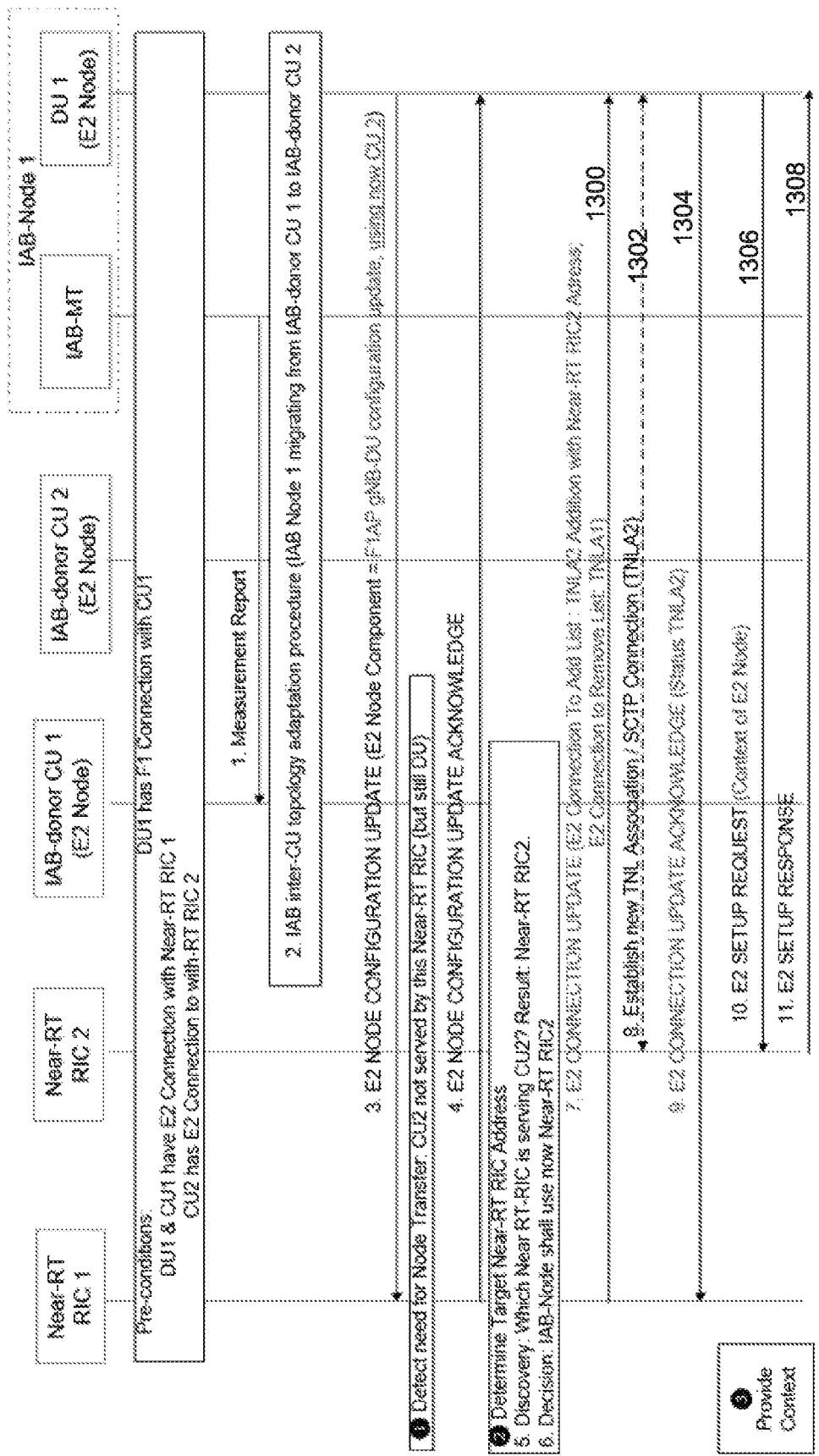
FIG. 13 shows an exemplified signalling chart for E2 Node transfer including a context transfer without a direct interface between Near-RT RICs according to another embodiment.

The signalling chart of FIG. 13 illustrates an example of otherwise similar messaging sequence as in FIG. 12, but without a direct R2 interface between the Near-RT RICs.

The first phases of the signalling are similar to the steps 1200-1212 in FIG. 12. However, since there is no direct interface between the Near-RT RICs, the Near-RT RIC1 informs the E2 Node that another Near-RT RIC, i.e. the Near-RT RIC2, shall be used. Therefore, the following message sequence may be used:

The Near-RT RIC1 sends an E2 CONNECTION UPDATE message (1300) to the E2 Node. Herein, the E2 CONNECTION UPDATE procedure may be extended such that the connection of multiple Near-RT RICs can be modified to enable an E2 Node transfer. Moreover, the E2 Connection configuration may be supplemented with TNLA2 connection addition of the new Near-RT RIC2 address, as well as removal of the TNLA1 connection of the old Near-RT RIC1 address.

The E2 Node then establishes (1302) the SCTP connection to new Near-RT RIC2 based on the TNLA2 connection addition. The E2 Node also acknowledges (1304) the connection update with a "E2 CONNECTION UPDATE ACKNOWLEDGE" message to the old Near-RT RIC1.

The E2 Node then performs an E2 SETUP REQUEST (1306) to the Near-RT RIC2, which may already include all relevant context information. Alternatively, the Near-RT RIC2 may be supplemented with the relevant context information in separate RIC procedures. The Near-RT RIC2 then responses with a E2 SETUP RESPONSE (1308).

Again, the order of at least some of the steps may vary without affecting to the achieved technical effect. For example, the message "E2 CONNECTION UPDATE ACKNOWLEGE" (1304) may be sent only after the E2 SETUP in messages (1306, 1308). Moreover, the message "E2 CONNECTION UPDATE" (1300) may be split into two messages, the first one adding the connection to the new Near-RT RIC2 and at a later stage another "E2 CONNECTION UPDATE" message is used to remove the connection to the old Near-RT RIC1.

Figure 14:
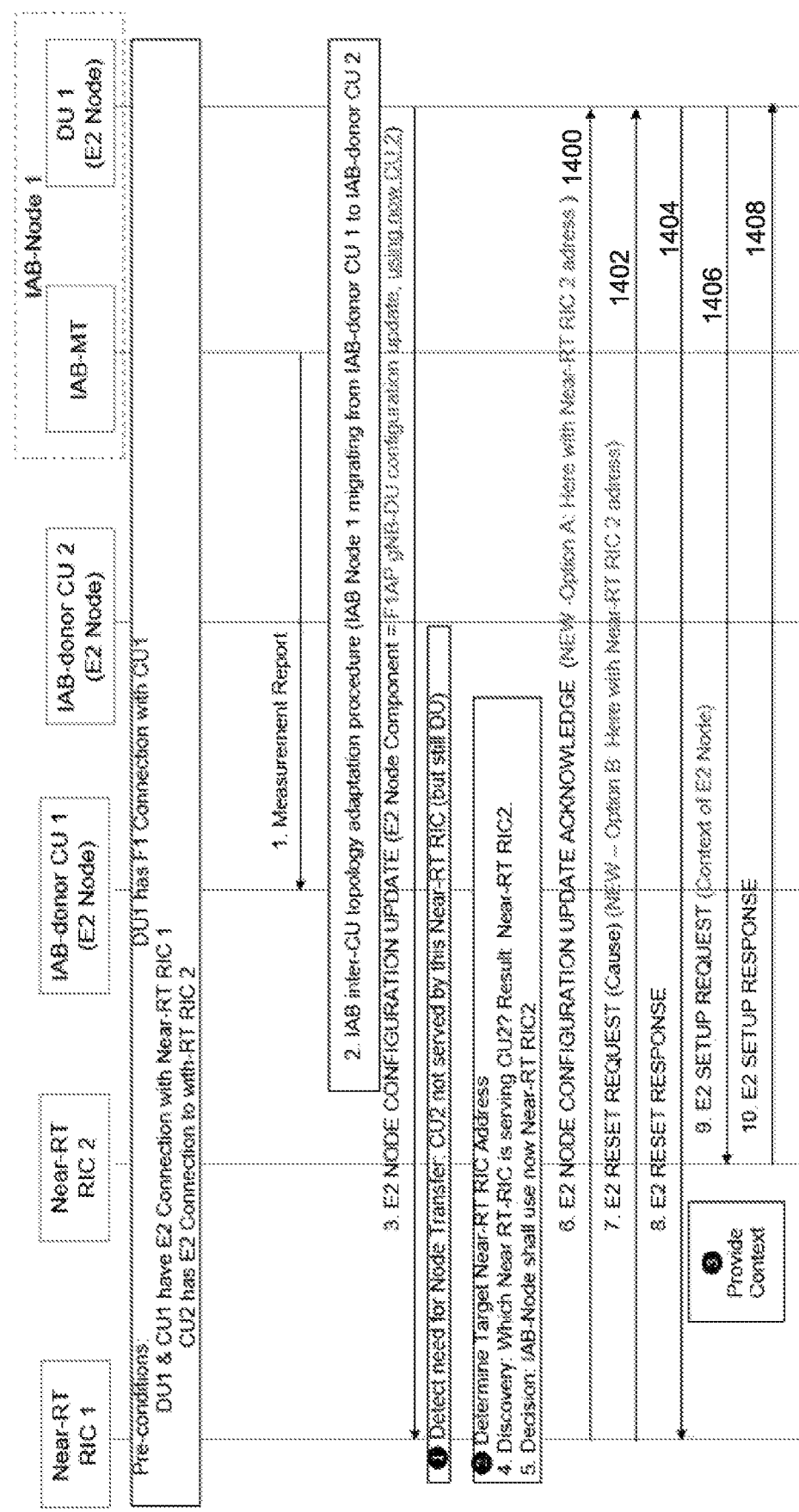
FIG. 14 shows an exemplified signalling chart for E2 Node transfer including a context transfer without a direct interface between Near-RT RICs according to yet another embodiment.

The signalling chart of FIG. 14 illustrates another example of otherwise similar messaging sequence as in FIG. 12, but without a direct R2 interface between the Near-RT RICs. The difference to the signalling chart of FIG. 13 is that a modified E2 Reset procedure is used.

The first phases of the signalling are similar to the steps 1200-1208 in FIG. 12. However, since there is no direct interface between the Near-RT RICs, the Near-RT RIC1 informs the E2 Node that another Near-RT RIC, i.e. the Near-RT RIC2, shall be used. Therefore, the following message sequence may be used:

In comparison to FIG. 12, the message E2 NODE CONFIGURATION UPDATE ACKNOWLEDGE (1210 in FIG. 12) may be changed to be sent after the Near-RT RIC1 determining (1212) the target RIC Address.

Herein, the message E2 NODE CONFIGURATION UPDATE ACKNOWLEDGE sent by the Near-RT RIC1 to the E2 Node (1400), may be modified with a new parameter indicating that after a RESET, a new Near-RT RIC shall be used. The address of the new Near-RT RIC2 is also provided to the E2 Node.

The Near-RT RIC1 sends the message E2 RESET REQUEST to the E2 Node (1402) in order to reset the connection of the Near-RT RIC1 and the E2 Node. As an alternative, the address of the new Near-RT RIC2 to be used after the RESET can also be provided in the E2 RESET REQUEST. The E2 NODE acknowledges (1404) this with an E2 RESET RESPONSE.

The E2 Node then performs an E2 SETUP REQUEST (1406) to the Near-RT RIC2, which may already include all relevant context information. Alternatively, the Near-RT RIC2 may be supplemented with the relevant context information in separate RIC procedures. The Near-RT RIC2 then responses with a E2 SETUP RESPONSE (1408).

As a yet another alternative for implementing the E2 Node/Context transfer between Near-RT RICs in a case where there is neither any direct interface between the Near-RT RICs and nor any Xn interface between the E2 nodes, the NG interface may be utilized to transfer the aforementioned messages in the message sequence charts. Hence, the core Network can relay the messages related to the context transfer procedures between the E2 nodes. For example, an NG mechanism of SON Configuration Transfer (between NG-RAN-AMF-NG-RAN) as specified in 3GPP TS 38.413 may be used, especially, the UPLINK RAN CONFIGURATION TRANSFER procedure and the DOWNLINK RAN CONFIGURATION TRANSFER procedure therein.

The method and the embodiments related thereto may be implemented in an apparatus implementing functionalities of a near-real-time radio access network intelligent controller. An apparatus according to an aspect comprises means for implementing a near-real-time radio access network intelligent controller; means for detecting an event triggering a need for transfer of control of at least one access node from said near-real-time radio access network intelligent controller to a target near-real-time radio access network intelligent controller; means for determining an address of the target near-real-time radio access network intelligent controller; means for establishing an interface between said near-real-time radio access network intelligent controller and the target near-real-time radio access network intelligent controller; and means for carrying out the transfer of the control of the at least one access node from said near-real-time radio access network intelligent controller to the target near-real-time radio access network intelligent controller.

According to an embodiment, said means for carrying out the transfer of the control of the at least one access node comprises means for transferring a context of the at least one access node from said near-real-time radio access network intelligent controller to the target near-real-time radio access network intelligent controller.

According to an embodiment, the context of the at least one access node comprises one or more of the following: a list of access nodes to be transferred, a list of configurations for each access node, a list of services and their mappings to interface-specific functions in each access node, and a list of active policies applied in each access node.

According to an embodiment, said event triggering the need for the transfer of the control of the access node is one of the following: an internal event of said near-real-time radio access network intelligent controller; an external event of said near-real-time radio access network intelligent controller; a command from another logical or physical network element to said near-real-time radio access network intelligent controller to initiate the transfer of the control of the access node.

According to an embodiment, said means for determining the address of the target near-real-time radio access network intelligent controller comprises means for obtaining the address from another logical or physical network element.

According to an embodiment, said means for determining the address of the target near-real-time radio access network intelligent controller comprises means for receiving the address from operations, administration and maintenance (OAM) functionality of the network.

According to an embodiment, said means for determining the address of the target near-real-time radio access network intelligent controller comprises means for carrying out a query about the address in a database.

According to an embodiment, the control of the at least one access node is configured to be transferred via a direct interface between the source near-real-time radio access network intelligent controller and target near-real-time radio access network intelligent controller.

According to an embodiment, the control of the at least one access node is configured to be transferred between the source near-real-time radio access network intelligent controller and target near-real-time radio access network intelligent controller via one or more access nodes.

According to an embodiment, the control of the at least one access node is configured to be transferred between the source near-real-time radio access network intelligent controller and target near-real-time radio access network intelligent controller via a non-real-time radio access network intelligent controller.

The means as referred to herein and in related embodiments may comprise at least one processor; and at least one memory including computer program code, the at least one memory and computer program code configured to, with the at least one processor, cause the performance of the apparatus.

An apparatus implementing functionalities of a near-real-time radio access network intelligent controller according to a further aspect comprises at least one processor and at least one memory, said at least one memory stored with computer program code thereon, the at least one memory and the computer program code configured to, with the at least one processor, cause the apparatus at least to perform: implement functionalities of a near-real-time radio access network intelligent controller; detect an event triggering a need for transfer of control of at least one access node from said near-real-time radio access network intelligent controller to a target near-real-time radio access network intelligent controller; determine an address of the target near-real-time radio access network intelligent controller; establish an interface between said near-real-time radio access network intelligent controller and the target near-real-time radio access network intelligent controller; and carry out the transfer of the control of the at least one access node from said near-real-time radio access network intelligent controller to the target near-real-time radio access network intelligent controller.

According to an embodiment, the apparatus comprises code configured to cause the apparatus to transfer a context of the at least one access node from said near-real-time radio access network intelligent controller to the target near-real-time radio access network intelligent controller.

According to an embodiment, the context of the at least one access node comprises one or more of the following: a list of access nodes to be transferred, a list of configurations for each access node, a list of services and their mappings to interface- specific functions in each access node, and a list of active policies applied in each access node.

According to an embodiment, said event triggering the need for the transfer of the control of the access node is one of the following: an internal event of said near-real- time radio access network intelligent controller; an external event of said near-real-time radio access network intelligent controller; a command from another logical or physical network element to said near-real-time radio access network intelligent controller to initiate the transfer of the control of the access node.

According to an embodiment, the apparatus comprises code configured to cause the apparatus to obtain the address from another logical or physical network element.

According to an embodiment, the apparatus comprises code configured to cause the apparatus to receive the address from operations, administration and maintenance (OAM) functionality of the network.

According to an embodiment, the apparatus comprises code configured to cause the apparatus to carry out a query about the address in a database.

According to an embodiment, the control of the at least one access node is configured to be transferred via a direct interface between the source near-real-time radio access network intelligent controller and target near-real-time radio access network intelligent controller.

According to an embodiment, the control of the at least one access node is configured to be transferred between the source near-real-time radio access network intelligent controller and target near-real-time radio access network intelligent controller via one or more access nodes.

According to an embodiment, the control of the at least one access node is configured to be transferred between the source near-real-time radio access network intelligent controller and target near-real-time radio access network intelligent controller via a non-real-time radio access network intelligent controller.

Such apparatuses may comprise e.g. the functional units disclosed in FIG. 6 for implementing the embodiments.

A further aspect relates to a computer program product, stored on a non- transitory memory medium, comprising computer program code, which when executed by at least one processor, causes an apparatus at least to perform: implement functionalities of a near-real-time radio access network intelligent controller; detect an event triggering a need for transfer of control of at least one access node from said near-real-time radio access network intelligent controller to a target near-real-time radio access network intelligent controller; determine an address of the target near-real-time radio access network intelligent controller; establish an interface between said near-real-time radio access network intelligent controller and the target near-real-time radio access network intelligent controller; and carry out the transfer of the control of the at least one access node from said near-real-time radio access network intelligent controller to the target near-real-time radio access network intelligent controller.

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended examples. However, all such and similar modifications of the teachings of this invention will still fall within the scope of this invention.

The invention claimed is:

1. An apparatus comprising:
   at least one processor; and
   at least one memory, said at least one memory storing computer program code thereon, the at least one memory and the computer program code configured to, with the at least one processor, cause the apparatus at least to perform:
   implementing functionalities of a near-real-time radio access network intelligent controller;
   detecting an event triggering a need for transfer of control of at least one access node from said near-real-time radio access network intelligent controller to a target near-real-time radio access network intelligent controller;
   determining an address of the target near-real-time radio access network intelligent controller;
   establishing an interface between said near-real-time radio access network intelligent controller and the target near-real-time radio access network intelligent controller; and
   carrying out the transfer of the control of the at least one access node from said near-real-time radio access network intelligent controller to the target near-real-time radio access network intelligent controller.

2. The apparatus according to claim 1, wherein said carrying out the transfer of the control of the at least one access node comprises
   transferring a context of the at least one access node from said near-real-time radio access network intelligent controller to the target near-real-time radio access network intelligent controller.

3. The apparatus according to claim 2, wherein the context of the at least one access node comprises one or more of the following: a list of access nodes to be transferred, a list of configurations for each access node, a list of services and their mappings to interface-specific functions in each access node, or a list of active policies applied in each access node.

4. The apparatus according to claim 1, wherein said event triggering the need for the transfer of the control of the access node is one of the following: an internal event of said near-real-time radio access network intelligent controller; an external event of said near-real-time radio access network intelligent controller; a command from another logical or physical network element to said near-real-time radio access network intelligent controller to initiate the transfer of the control of the access node.

5. The apparatus according to claim 1, wherein said determining the address of the target near-real-time radio access network intelligent controller comprises
   obtaining the address from another logical or physical network element.

6. The apparatus according to claim 1, wherein said determining the address of the target near-real-time radio access network intelligent controller comprises
   receiving the address from operations, administration and maintenance (OAM) functionality of the network.

7. The apparatus according to claim 1, wherein said determining the address of the target near-real-time radio access network intelligent controller comprises
   carrying out a query about the address in a database.

8. The apparatus according to claim 1, wherein the control of the at least one access node is configured to be transferred via a direct interface between the source near-real-time radio access network intelligent controller and target near-real-time radio access network intelligent controller.

9. The apparatus according to claim 1, wherein the control of the at least one access node is configured to be transferred between the source near-real-time radio access network intelligent controller and target near-real-time radio access network intelligent controller via one or more access nodes.

10. The apparatus according to claim 1, wherein the control of the at least one access node is configured to be transferred between the source near-real-time radio access network intelligent controller and target near-real-time radio access network intelligent controller via a non-real-time radio access network intelligent controller.

11. A method comprising:
    detecting, by a near-real-time radio access network intelligent controller, an event triggering a need for transfer of control of at least one access node from said near-real-time radio access network intelligent controller to a target near-real-time radio access network intelligent controller;
    determining, by said near-real-time radio access network intelligent controller, an address of the target near-real-time radio access network intelligent controller;

establishing an interface between said near-real-time radio access network intelligent controller and the target near-real-time radio access network intelligent controller; and carrying out the transfer of the control of the at least one access node from said near-real-time radio access network intelligent controller to the target near-real-time radio access network intelligent controller.

12. The method according to claim 11, further comprising transferring a context of the at least one access node from said near-real-time radio access network intelligent controller to the target near-real-time radio access network intelligent controller.

13. The method according to claim 12, wherein the context of the at least one access node comprises one or more of the following: a list of access nodes to be transferred, a list of configurations for each access node, a list of services and their mappings to interface-specific functions in each access node, and a list of active policies applied in each access node.

* * * * *